United States Patent Office 3,422,207
Patented Jan. 14, 1969

3,422,207
VISUAL FLIGHT TRAINING APPARATUS
Maurice Shirley Flower, Forest Row, Sussex, England, and Roy Alfred George Gasson, Tilgate, Crawley, Sussex, England, assignors to Communications Patents Limited
Filed Feb. 10, 1964, Ser. No. 343,773
Claims priority, application Great Britain, Mar. 8, 1963, 9,229/63
U.S. Cl. 35—10.2                          9 Claims
Int. Cl. G09 *1/00*

ABSTRACT OF THE DISCLOSURE

Control apparatus for use in visual flight training apparatus, of the kind in which a television camera is used to view a model and a scene is provided to the trainee crew by a television receiver fed with a video signal from the television camera, whereby effects corresponding to the presence of a layer of cloud or of flying into or out of a layer of cloud may be simulated. The control apparatus includes two servos, one of which controls the level of the video signal fed to the receiver and the other, the level of a grey signal fed to the receiver.

Figure 1:
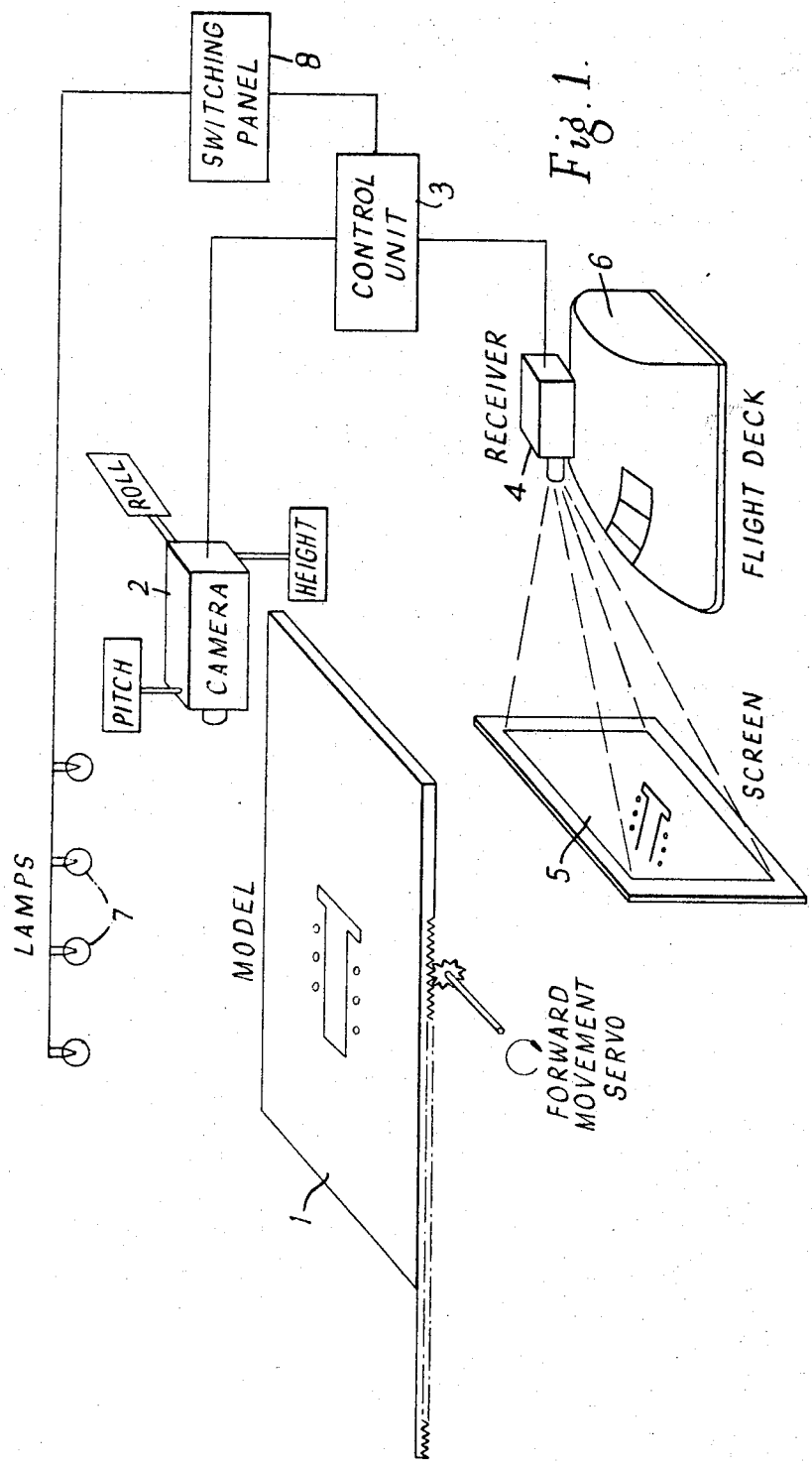

The levels of the signals are varied according to the simulated height of the aircraft with respect to a preset height of cloud base, in a manner to provide a visual display of the scene represented by the model when flying below the cloud base, a uniform grade response when flying above the cloud base and a response of varying brightness when the aircraft is entering or merging from the layer of cloud.

---

This invention relates to ground-based flight training apparatus in which visual effects are simulated to correspond to the view seen by the crew of an aircraft during actual flight, and in particular to apparatus in which visual effects can be simulated at will corresponding to the view seen when actually taking off or landing in weather conditions in which the ground is obscured from the aircraft by cloud in the vicinity of the earth's surface.

In modern flight training, use is made of flight simulators of the type which provide a visual presentation of objects seen from the flight deck of an aircraft during low altitude phases of a flight, in addition to providing instruments responsive to setting of the flight and engine controls of the aircraft simulated.

Visual systems capable of a high degree of realism advantageously employ a television camera to view a detailed scale model. The scene presented to the trainee crew is then provided by a television receiver fed with signals from the television camera. The camera is movable relatively to the model, so that the view presented of the external objects provided in the model changes correspondingly to the simulated movement of an aircraft.

In actual flying, takeoff and landing operations become more difficult in weather conditions where the view of the ground from above is obscured by cloud. It is desirable, therefore, to provide effects corresponding to such conditions in visual flight training apparatus.

It is an object of the present invention to provide, in ground-based flight training and visual simulating apparatus, means whereby visual effects corresponding to the presence of a layer of cloud may be simulated.

It is a further object of the present invention to provide, in such apparatus, means whereby visual effects corresponding to those which occur when flying into or out of a layer of cloud may be simulated.

Accordingly, the invention provides ground-based flight training apparatus, including apparatus for simulating visual effects corresponding to the simulated flight of an aircraft, comprising a representation of the surface of the earth, a television camera for viewing at least a portion of the representation and providing electric video signals corresponding to the scene viewed, a television receiver, responsive to the electric video signals, for providing on a screen an image of the said scene viewed, and control means whereby the image provided by the receiver is obscured when the computed height of the aircraft is substantially equal to or greater than the height of the base of a simulated layer of cloud.

In the preceding paragraph and in the appended claims the term "representation of the surface of the earth" is to be understood in a broad sense, since the representation may be an aircraft carrier flight deck together with surrounding sea features.

Figure 2:
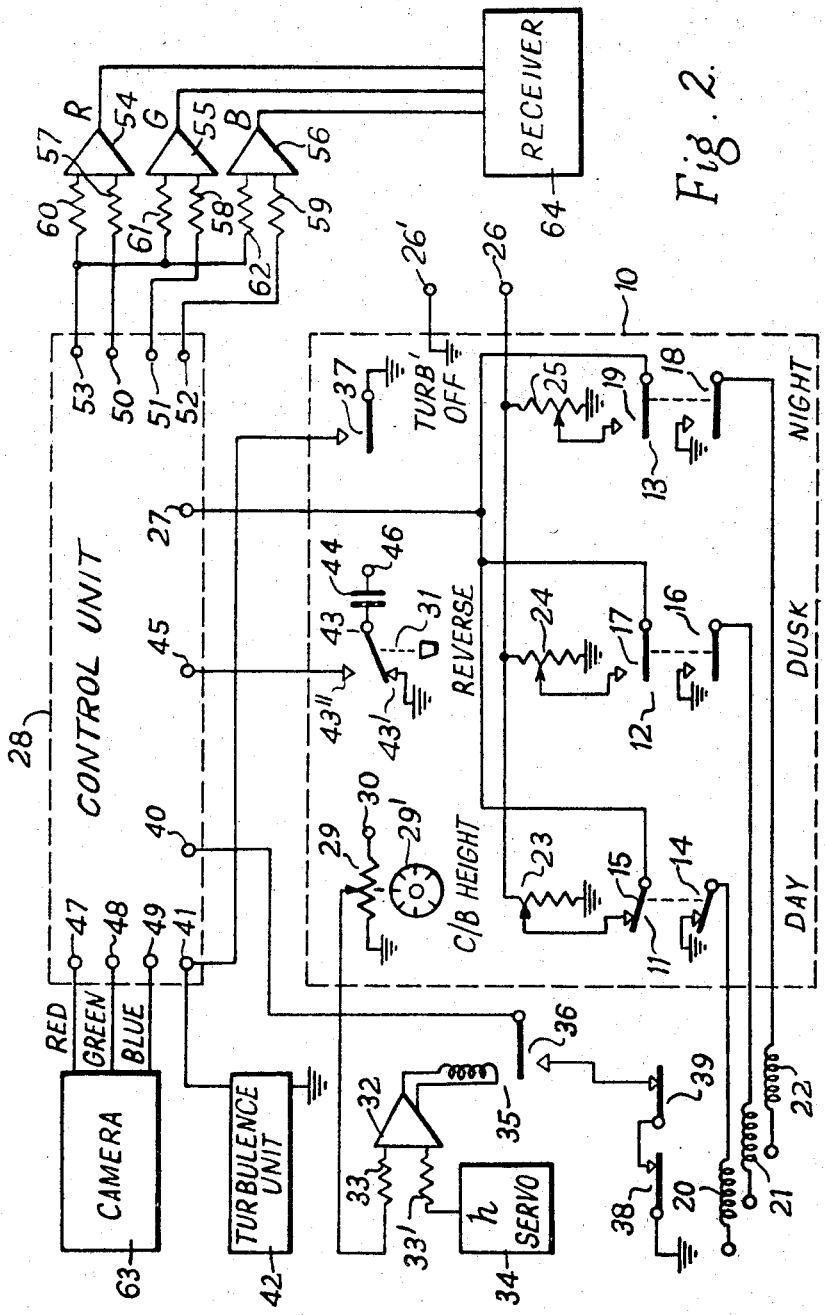
Figure 3:
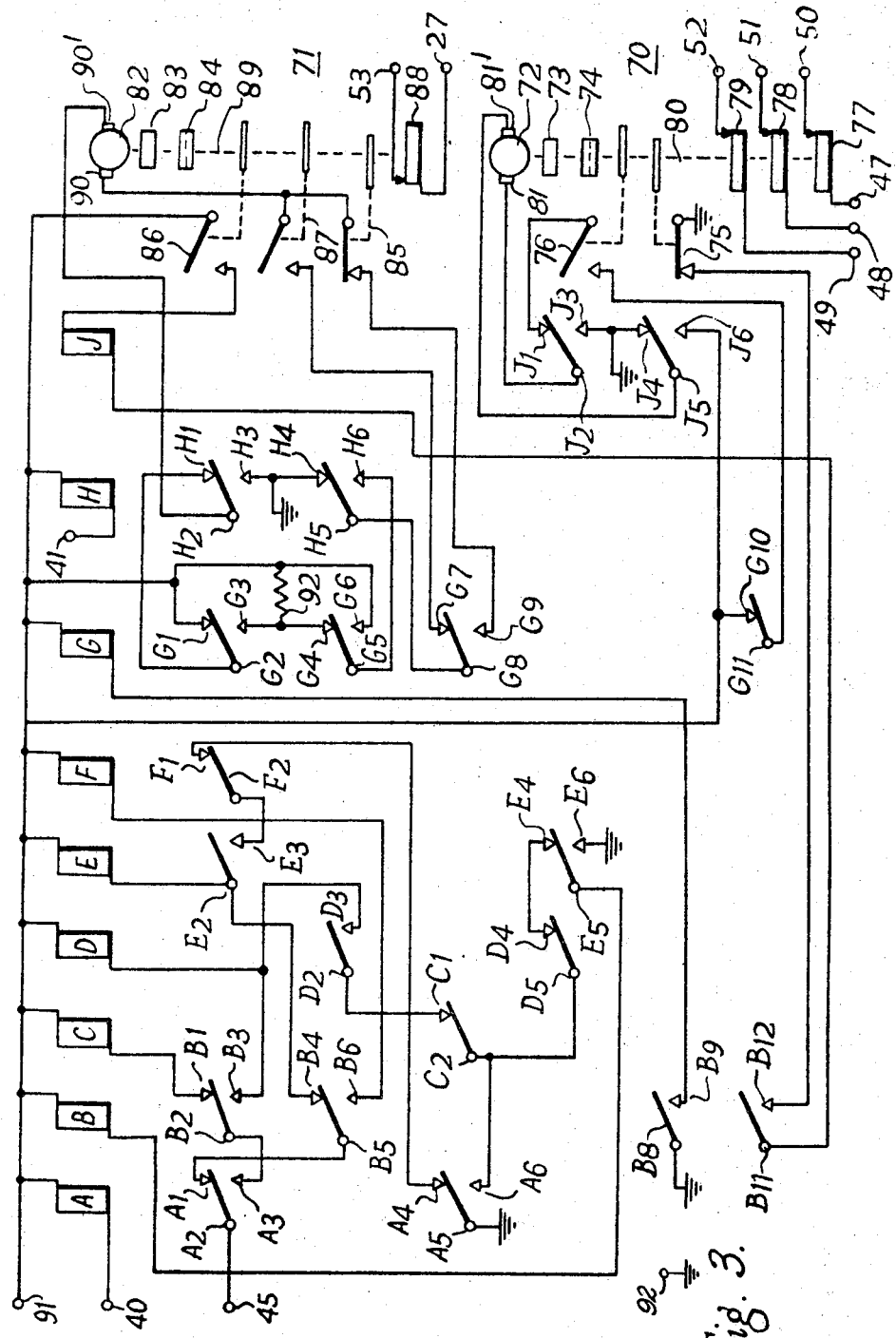

In order that the invention may be readily carried into effect an embodiment thereof will now be described in detail, by way of example, with reference to the accompaning drawings, in which:

FIG. 1 shows, in diagrammatic form, the basic elements of a visual system for a ground-based flight training apparatus, FIG. 2 shows, in diagrammatic form, a switching panel and an automatic control unit, forming part of an instructor's control unit, of a visual flight simulator, and FIG. 3 is a schematic diagram of the automatic control unit of FIG. 2.

In FIG. 1, a detailed scale model 1, representing objects seen from the flight deck of an aircraft during a flight, is viewed by television camera 2. Signals from the television camera 2 are fed, by way of an automatic control unit 3, to a television receiver 4, by which a view is projected onto a screen 5, of the external objects provided in the model. The view on the screen is visible to a trainee crew accommodated within a simulated flight deck 6 of the training apparatus.

The model and the camera are movable relatively to one another so that the view changes correspondingly to the simulated movement of the aircraft. The model is illuminated by a battery of lamps 7, which are brought into operation by a switching panel 8, so that different conditions of visibility may be simulated.

Referring to FIG. 1, a switching panel, indicated by the broken line 10, mounted on a control console, not shown, is located in that part of the simulator under the control of an instructor.

Switches 11, 12, and 13, mounted on the panel 10, enable the instructor to control the lighting of a model, representative of the surface of the earth, so that conditions of visibility may be simulated, corresponding to those present during the day, at dusk or during the night. Switch 11 is provided with contact pairs 14 and 15, switch 12 with contact pairs 16 and 17, and switch 13 with contact pairs 18 and 19. The contact pairs 14, 16 and 18 are connected to coils 20, 21 and 22 of contactors, not shown, by which the illumination of the model is controlled.

Full illumination of the model is provided if switch 11 is operated and contact pairs 14 and 15 are closed, corresponding to conditions of visibility which occur during the day. Reduced illumination of the model is provided if switch 12 is operated and contact pairs 16 and 17 are closed, corresponding to conditions of visibility which occur at dusk. Runway marker and boundary lighting units are brought into operation, to represent the appearance of a runway at night, if switch 13 is operated and contact pairs 18 and 19 are closed.

Preset potentiometer units 23, 24 and 25 are fed with current from a D.C. source of supply, not shown, connected to terminal 26, and to the chassis by way of terminal 26'. The potentiometers have their wipers connected by way of contact pairs 15, 17 and 19 to a common output and provide a bias voltage to an input terminal 27 of a control unit, indicated by the broken outline 28. The control unit is described in detail later in the specification.

A potentiometer control 29 and switches 31 and 37 are also mounted on the switch panel 10. The potentiometer control enables the instructor to set the height of the base of a simulated layer of cloud to any desired value between zero and 1,000 feet. The winding of potentiometer 29 is fed with current from a source of supply, not shown, which is connected to terminal 30 and to the chassis. The wiper of the potentiometer is coupled to a knob having a dial 29' which is calibrated to indicate heights between 0 and 1,000 feet. The output voltage from the wiper is fed to a first input of a switching amplifier 32 by way of a summing resistor 33. A second input is fed to the amplifier 32 via a summing resistor 33' from an $h$ servo unit 34, which is part of the altitude computing system of the associated flight simulator.

The voltages are of opposite polarity and the values of the summing resistors 33 and 33' are such that the input to the amplifier 32 is zero when the height of the cloud base, indicated by the dial 29', is equal to the computed height of the simulated aircraft. The output of the amplifier 32 is fed to the winding of a relay 35, so that a contact pair 36' of the relay is closed if the computed height of the aircraft is less than the height of the cloud base. The contact pair 36 and the contact pairs of the two switches 38 and 39 are connected in series. One contact of the contact pair 36 is connected to the terminal 40 of the control unit 38 and one contact of the contact pair 38 is connected to the chassis.

The switches 38 and 39 are associated with the camera movement system and are located at positions such that a contact pair is opened if the desired limit of travel of the camera in a given direction is exceeded.

An input terminal 41 of the unit 28 is connected to contacts, not shown, of a turbulence unit 42 which are also connected to the chassis. In this unit, which is part of the computing system of the simulator, the contacts are closed intermittently and in a random manner. This unit is used to provide effects corresponding to those which occur in an aircraft during conditions of turbulence, for example, fluctuations in the readings of the flight instruments and vibration of the fuselage. The contacts of switch 37 are connected to the terminal 41 and to chassis. The switch 37 is closed if the effects produced by the turbulence unit 42 are not required.

A switch 31 is provided to enable the instructor to change from conditions of full visibility to conditions of visibility where the aircraft is flying in cloud and viceversa, irrespective of the setting of the control 29. The switch 31 is spring-loaded and is provided with change-over contacts 43, 43' and 43''. Contacts 43' and 43'' are connected respectively to chassis and to an input terminal 45 of the unit 28. With the switch in a relaxed position a capacitor 44, connected to the contact 43, is charged from a source of supply, not shown, connected to terminal 46 and to the chassis. The capacitor 44 is discharged into a load in the unit 28 if the switch 31 is operated so that contacts 43 and 43'' are closed.

The unit 28 has input terminals 47, 48 and 49 to which video signals are fed from red, green and blue channels respectively of a colour television camera 63. The amplitudes of the video signals and the amplitude of the bias voltage fed to terminal 27 are controlled in the unit 28 in a manner to be described later in this specification. The controlled video signals are supplied to output terminals 50, 51 and 52 and the controlled bias voltage is supplied to terminal 53 as a "grey" signal. The video signals from terminals 50, 51 and 52 are fed to the inputs of amplifiers 54, 55 and 56 respectively, by way of summing resistors 57, 58 and 59 respectively. The bias voltage from terminal 53 is fed to the amplifiers 54, 55 and 56 by way of summing resistors 60, 61 and 62 respectively. The video signal outputs of amplifiers 54, 55 and 56 are fed to the red, green and blue channels respectively of a television receiver 64, providing the scene presented to the trainee crew. The scene presented is a colour representation of the scene viewed by the television camera when provided by the video signals at terminals 50, 51 and 52 and a uniform grey scene when provided by the grey signal at terminal 53.

In the unit 28, shown schematically in FIG. 3, the video signals and the bias voltage are controlled in amplitude by servo units indicated generally by reference numbers 70 and 71. In FIG. 3, the output and input terminals of the unit 28 are indicated by the same reference numbers as in FIG. 2.

The unit 70 comprises a D.C. motor 72, a speed reduction gear 73, coupled to the shaft of the motor, a friction clutch 74, cam-operated switches 75 and 76 and potentiometers 77, 78 and 79. The wipers of the potentiometers 77, 78 and 79 and the cams of the switches 75 and 76 are mechanically coupled to a shaft 80 which is driven by the output shaft of the speed reduction gear 73, via the friction clutch 74. The wipers of the potentiometers 77, 78 and 79 are connected to the output terminals 50, 51 and 52 respectively.

The direction of rotation of the armature of the motor 72 is determined by the polarity of the source of current to which brushes 81 and 81' of the motor are connected. If the brushes 81 and 81' are of positive and negative polarity respectively, the shaft 80 rotates in a clockwise direction, so that the output signals from terminals 50, 51 and 52 decrease in amplitude. Similarly, if the brushes 81 and 81' have negative and positive polarity respectively, the shaft 80 rotates in a counterclockwise direction, so that the signals from terminals 50, 51 and 52 increase in amplitude.

The cams of switches 75 and 76 are positioned on the shaft 80 so that the contacts of switch 75 are closed and the contacts of the switch 76 are open, if the wipers of potentiometers 77, 78 and 79 are rotated to a fully clockwise position. Conversely, the contacts of switch 75 are open and the contacts of switch 76 are closed if the wipers of the potentiometers are rotated to a fully counterclockwise position.

In the diagram, the wipers of the potentiometers are shown in the fully clockwise position and the contacts of the switches in corresponding positions.

The unit 71 comprises a D.C. motor 82, a speed reduction gear 83, coupled to the shaft of the motor, a friction clutch 84, cam-operated switches 85, 86 and 87 and a potentiometer 88. The wiper of the potentiometer 88 and the cams of the switches 85, 86 and 87 are mechanically coupled to a shaft 89, which is driven by the output shaft of the speed reduction gear 83, via the friction clutch 84. The wiper of the potentiometer 88 is connected to the terminal 53. The direction of rotation of the armature of the motor 72 is determined by the polarity of the source of current to which brushes 90 and 90' of the motor are connected. If the brushes 90 and 90' are of positive and negative polarity respectively, the shaft 89 rotates in a clockwise direction so that the output voltage from the wiper of potentiometer 88 decreases in amplitude. Similarly, if the brushes 90 and 90' are of negative and positive polarity respectively, the shaft 89 rotates in a counterclockwise direction, so that the voltage from the terminal 53 increases in amplitude.

The cams of switches 85, 86 and 87 are positioned on the shaft 89 so that the contacts of switch 85 are closed and the contacts of switches 86 and 87 are open if the wiper of potentiometer 88 is rotated to a fully counterclockwise position. Conversely, the contacts of switch 85 are open and the contacts of switches 86 and 87 are closed if the wiper of potentiometer 88 is rotated to a fully clockwise position.

In FIG. 3 the wiper of the potentiometer 88 is shown in the fully counterclockwise position and the contacts of the switches are in corresponding positions.

Current from a D.C. source of supply, not shown, connected to terminals 91 and 92, is fed from terminal 91, is fed to the motors 72 and 82, via contacts of the switches 76, 85 and 87 and the contacts of three relays of a group of nine relays which are part of the unit 28. The nine relays are indicated by the reference letters A to H and J. Terminal 92 of the source of supply is connected to the chassis.

Relay A has two sets of changeover contacts $A_1$, $A_2$, $A_3$, and $A_4$, $A_5$, $A_6$; relay B has two sets of changeover contacts $B_1$, $B_2$, $B_3$ and $B_4$, $B_5$, $B_6$, and two sets of open contacts $B_8$, $B_9$ and $B_{11}$, $B_{12}$; relay C has one set of closed contacts $C_1$, $C_2$; relay D has one set of open contacts $D_2$, $D_3$, and one set of closed contacts $D_4$, $D_5$; relay E has one set of open contacts $E_2$, $E_3$ and one set of changeover contacts $E_4$, $E_5$, $E_6$; relay F has one set of closed contacts $F_1$, $F_2$; relay G has three sets of changeover contacts $G_1$, $G_2$, $G_3$; $G_4$, $G_5$, $G_6$, and $G_7$, $G_8$, $G_9$, and one set of closed contacts $G_{10}$, $G_{11}$; relay H has two sets of changeover contacts $H_1$, $H_2$, $H_3$ and $H_4$, $H_5$, $H_6$; relay J has two sets of changeover contacts $J_1$, $J_2$, $J_3$ and $J_4$, $J_5$, $J_6$.

In FIG. 3, the contacts of the relays are shown in the positions assumed with the coils of the relays de-energised.

The coils of the relays A to H and J are fed with direct current from the source of supply connected to terminal 91. Relays A to H are connected so that a relay is operated when a conductive path is provided between the winding and terminal 92 of the source of supply.

The operation of the apparatus during a flight in which a simulated landing is carried out, in conditions of daylight, will now be described.

Let it be assumed that the camera is positioned at maximum height at a boundary of the model, corresponding to the position of an aircraft about to carry out an approach for landing. Let it also be assumed that weather conditions are such that the aircraft is flying in a layer of cloud.

The coils of the relays A to G and J are de-energised. The servos 70 and 71 are at positions where the video signals from terminals 50, 51 and 52 are zero and the value of the output voltage provided at terminal 53 is a maximum.

Referring again to FIG. 2, the switch 11 is operated and the model is fully illuminated to correspond to conditions of full daylight. The voltage provided at terminal 53 corresponds to the output voltage of the potentiometer 23. This potentiometer is preset so that the value of the voltage fed to summing resistors 60, 61 and 62 is such that the screen of the receiver 63 provides a uniform response similar to that observed when an aircraft is flying in cloud. The values of the summing resistors 60, 61 and 62 are chosen so that the relative levels of the red, green and blue inputs fed to the receiver are such that a grey response is provided.

The control 29 is set to a position to correspond to the height of the cloud base it is desired to simulate, which, in this instance, is assumed to be less than the height of the simulated aircraft at the commencement of the approach. Thus, the contacts 36 of relay 35 are open. The contact pairs of switches 38 and 39 are closed.

The contacts of the switch 37 are open, and there is an intermittent flow of current through the coil of the relay H as a result of the opening and closing of the contacts of the unit 42.

On the screen of the receiver a uniform grey image is provided, corresponding to the view seen from an aircraft when flying in a layer of cloud.

The landing operation is commenced by making a descent and flying in a direction to bring the camera towards an area of the model providing a representation of a runway. As the height of the aircraft decreases the output signal of the $h$ servo 34 decreases and, at the instant of time when the two inputs to amplifier 32 become substantially equal, relay 35 is operated. With relay 35 operated the contact pair 36 is closed and so that current from the terminal 40 is returned to terminal 92 of the source of supply via the closed contact pairs 38 and 39.

Referring again to FIG. 3, relay A is operated via the closed contact pairs 36, 38 and 39. Relay B is operated via closed contacts $E_4$, $E_5$, closed contacts $D_4$, $D_5$ and closed contacts $A_5$ and $A_6$. Relay G is operated via closed contacts $B_8$, $B_9$.

Relay H is operated intermitently, via the contacts of the turbulence unit 42, FIG. 2. With relay H operated, current is fed to the brush 90 of the motor 82, via closed contacts $G_5$, $G_6$, closed contacts $H_5$, $H_6$, closed contacts $G_8$, $G_9$, and closed contacts of the switch 85. Current from the brush 90' is returned to the source of supply via closed contacts $H_2$, $H_3$. The polarity of the brushes 90 and 90' is positive and negative respectively, hence the shaft 89 rotates in a clockwise direction and the grey image provided by the receiver decreases in brightness.

With relay H relaxed, current is fed to brush 90' via a resistor 92, closed contacts $G_2$, $G_3$, and closed contacts $H_1$, $H_2$. Current from the brush 90 is returned to the source of supply, via closed contacts of the switch 85, closed contacts $G_8$, $G_9$ and closed contacts $H_4$, $H_5$. The polarity of the brushes 90 and 90' is negative and positive respectively, hence the shaft 89 rotates in a counterclockwise direction and the grey image provided by the receiver increases in brightness.

The speed of rotation of the shaft 89 in the counterclockwise direction is less than that in the clockwise direction, due to the drop in voltage across the resistor 92. Thus, the wiper of potentiometer 88 travels towards the position of zero output voltage in a series of clockwise and counterclockwise movements. The brightness of the grey image decreases and increases with these movements, corresponding to the changes in average brightness observed by the crew of an aircraft when emerging from cloud, due to irregularities in the cloud formation.

After a few such movements, the switch 86 is operated and relay J is operated. The coil of relay J is connected to terminal 91, of a source of supply, via closed contacts of the switch 86 current is returned to the source of supply via closed contacts $B_{11}$, $B_{12}$ and closed contacts of the switch 75. With relay J operated, current is fed to the brush 81' of motor 72, via closed contacts $J_5$, $J_6$. Current from the brush 81 is returned to the source of supply via closed contacts $J_2$, $J_3$.

The polarity of the brushes 81, 81' is negative and positive, respectively, hence the shaft 80 rotates in a counterclockwise direction and the video signals from the wipers of potentiometers 77, 78 and 79 increase in amplitude. An image of increasing brightness of that part of the model within the field of view of the camera is provided by the receiver, corresponding to the appearance of the view of the ground observed in an actual aircraft when flying out of a layer of cloud.

The shaft 80 continues to rotate until the video signals provided by the potentiometers 77, 78 and 79 are a maximum and the cams of the switches 75 and 76 reach a position where the contacts of the switch 75 are open and the contacts of the switch 76 are closed.

With the contacts of switch 75 open, the relay J is relaxed, contacts $J_5$, $J_6$ are open and the supply of current to the brush 81' is interrupted. The armature of the motor 72 then comes to rest.

A few seconds after the armature of the motor has come to rest, the shaft 89 of srevo 71 reaches a position where the output voltage of the potentiometer 88 is zero and the positions of the cams of switches 85 and 87 are such that the contacts of switch 85 are open and the contacts of switch 87 are closed.

With the contacts of switch 85 open, the supply of current to and from brush 90 is interrupted. The armature of the motor 82 then comes to rest.

With the armatures of the motors 72 and 82 at rest, a view of the ground is provided during the remainder of the landing operation. The view presented to the trainee crew varies according to the altitude, attitude and position of the aircraft, so that that part of the landing operation when the ground is visible is realistically simulated.

The operation of the apparatus in a flight in which a simulated takeoff is carried out, in conditions of daylight, will now be described.

Let it be assumed that the camera is positioned at minimum height, at a point on the model corresponding to the position of an aircraft about to take off for a flight. Let it also be assumed that weather conditions are such that a layer of cloud is present.

The coils of relays A, B and G are energised and the coil of relay H is energised intermitently by way of the turbulence unit 42. The wipers of potentiometers 77, 78 and 79 are in the fully counterclockwise position and the wiper of potentiometer 88 is in the fully clockwise position.

An image of that part of the model within the field of view of the camera is provided by the receiver.

The operation is commenced after a takeoff run by making an ascent and flying in a direction towards a boundary of the model. As the height of the aircraft increases the output signal from the $h$ servo 34, FIG. 2, in creases and at the instant of time when the height of the aircraft and the height of the cloud base are substantially equal, the contact pair 36, FIG. 2, open.

Relays A, B, G and J are relaxed. With relay H operated, a supply of current is fed to the brush 90 of the motor 82, via the resistor 92, closed contacts $G_4$, $G_5$, closed contacts $H_5$, $H_6$, closed contacts $G_7$, $G_8$ and the closed contacts of switch 87. Current from the brush 90' is returned to the source of supply via contacts $H_2$, $H_3$. The polarity of the brushes 90 and 90' is positive and negative respectively, hence the shaft 89 remains at rest with the wiper of the potentiometer 88 in the fully clockwise position whilst the armature of the motor 82 is allowed to rotate slowly by slipping of the clutch 84.

With play H relaxed, a supply of current is fed to the brush 90' via closed contacts $G_1$, $G_2$ and closed contacts $H_1$, $H_2$. Current from the brush 90 is returned to the source of supply via the closed contacts of switch 87, closed contacts $G_7$, $G_8$ and closed contacts $H_4$, $H_5$. The polarity of the brushes 90 and 90' is negative and positive respectively, hence the shaft 89 rotates at full speed in a counterclockwise direction.

The speed of rotation of the shaft 89 in the counterclockwise direction is greater than that in the clockwise direction. Thus the wiper of potentiometer 88 travels towards the position of maximum output voltage, in a series of clockwise and counterclockwise movements. The brightness of the background increases and decreases with these movements, corresponding to the changes in brightness observed by the crew of an aircraft when entering a layer of cloud, due to irregularities of the cloud formation.

After a few such movements, the switch 86 is operated and its contacts are opened. The contacts of switch 85 are closed and the contacts of the switch 87 are opened as the wiper of potentiometer 88 approaches the fully counterclockwise position. With the contacts of switch 87 open, the brush 90 is disconnected from the supply, the flow of current to the motor 82 is interrupted and its armature comes to rest.

With relays G and J relaxed, current is fed to the brush 81 of motor 72 via closed contacts $G_{10}$, $G_{11}$, the closed contacts of switch 76 and closed contacts $J_1$, $J_2$. Current from the brush 81' is returned to the source of supply via closed contacts $J_4$, $J_5$. The polarity of the brushes 81, 81' is positive and negative respectively, hence the output shaft 80 rotates in a clockwise direction and the video signals from the wipers of potentiometers 77, 78 and 79 decrease in amplitude. The shaft 80 continues to rotate until the video signals are zero and the cams of the switches 75 and 76 reach a position where the contacts of switch 75 are close dand the contacts of switch 76 are open. The supply of current to the brush 81 is interrupted and the armature of the motor 72 then comes to rest.

With the armatures of the motors 72 and 82 at rest, a uniform grey image is provided by the receiver, corresponding to the view seen from an aircraft when flying in a layer of cloud. The view of cloud is continued after the camera has reached a position at a boundary of the model and has come to rest, so that a simulated flight may be continued indefinitely under conditions where the aircraft is flying in a layer of cloud. The switches 38 and 39 ensure that a view of cloud is provided if the simulator is flown to a boundary of the model, irrespective of the height at which the simulated flight is taking place, and the simulated height of the cloud base.

In the operation of the simulator, it is convenient to be able to provide, at will, visual conditions corresponding to those where the aircraft is on-ground or is flying in cloud, so that the simulator may be prepared for a takeoff or landing operation without the need for carrying out the corresponding simulated flight. The control switch 31, FIG. 2, is provided for this purpose.

Let it be assumed that the simulated aircraft is on-ground and that it is desired to provide visual effects corresponding to those seen from an aircraft flying in cloud.

Relays A and B are operated, the wiper of potentiometer 88 and the wipers of potentiometers 77, 78 and 79 are at the fully clockwise and fully counterclockwise positions respectively. The switch 31 is operated to close contacts 43, 43'' momentarily and the capacitor 44 FIG. 1 is discharged through the coil of relay D, via closed contacts $A_2$, $A_3$, and closed contacts $B_2$, $B_3$. Relay D operates and is maintained in an energised condition via closed contacts $D_2$, $D_3$, closed contacts $C_1$, $C_2$ and closed contacts $A_5$, $A_6$, contact $A_5$ being connected to chassis. With relay D operated relay B is relaxed, since the contacts $D_4$, $D_5$ are now open and the coil of relay B is no longer energised. With relay B relaxed, the operation of the servos 70 and 71 proceeds in the manner of the takeoff operation already described.

Let it be assumed that it is required to restore the control apparatus to a condition where on-ground visual effects are again provided. Relay A is operated, relay B is relaxed, the wiper of the potentiometer 88 and the wipers of potentiometers 77, 78 and 79 are at the fully counterclockwise and fully clockwise positions respectively.

The switch 31 is operated to close contacts 43, 43'' momentarily, and the capacitor 44 is discharged through the coil of relay C, via closed contacts $A_2$, $A_3$ and closed contacts $B_1$, $B_2$. With relay C operated, contacts $C_1$, $C_2$ are open and the supply of current to relay D is interrupted. With relay D relaxed, relay B is operated via closed contacts E₄, E₅, closed contacts D₄, D₅ and closed contacts A₅, A₆. With relay B operated, the operation of the servos 70 and 71 proceeds in the manner of the landing operation already described.

Let it be assumed that the simulated aircraft is flying in a layer of cloud and that it is desired to provide visual effects corresponding to those seen from an aircraft when on-ground or flying below a layer of cloud.

Relay A is relaxed, the wiper of potentiometer 88 and the wipers of potentiometers 77, 78 and 79 are at the fully counterclockwise and fully clockwise positions, respectively.

The switch 31 is operated to close contacts 43, 43" momentarily and the capacitor 44 is discharged through the coil of relay E, via closed contacts A₁, A₂ and closed contacts B₄, B₅. Relay E operates and is maintained in an operated condition via closed contacts E₂, E₃, closed contacts F₁, F₂ and closed contacts A₄, A₅. With relay E operated, the coil of relay B is energised via closed contacts E₅, E₆. With relay B operated, the operation of the servos 70 and 71 proceeds in the manner of the landing operation already described.

Let it be assumed that it is required to restore the control apparatus to a condition where visual effects corresponding to flying in cloud are again provided.

Relay A is relaxed, the wiper of potentiometer 88 and the wipers of potentiometers 77, 78 and 79 are at the fully clockwise and fully counterclockwise positions, respectively.

The switch 31 is operated to close contacts 43, 43" momentarily, and the capacitor 44 is discharged through the coil of relay F via closed contacts B₅, B₆ and closed contacts A₁, A₂. With relay F operated, the supply of current to the coil of relay E is interrupted, and with relay E relaxed, the supply of current to the coil of relay B is interrupted.

With relay B relaxed, the operation of servos 70 and 71 proceeds in the manner of the takeoff operation already described.

In the preceding description, apparatus is described for simulating takeoff and landing operations in conditions of daylight.

Referring again to FIG. 2 to simulate takeoff and landing operations in conditions of dusk, switch 11 is opened and switch 12 is closed.

Reduced illumination of the model is provided by the operation of the contactor associated with the coil 21. The voltage fed from the wiper of preset potentiometer 24 is less than that provided by the potentiometer 23 as the level of brightness of the image provided by the receiver, when the simulated aircraft is flying in cloud, corresponds to that observed from an aircraft when flying at dusk.

In simulated takeoff and landing operations at night, switches 11 and 12 are opened and switch 13 is closed, so that the runway of the model is illuminated by operation of the contactor associated with the coil 22. The voltage fed from the wiper of the preset potentiometer 25 is less than that provided by the potentiometers 23 and 24, so that a black background is provided by the receiver, corresponding to that observed by an aircraft when flying at night.

What we claim is:

1. Ground-based flight training apparatus, including apparatus for simulating visual effects corresponding to the simulated flight of an aircraft, comprising a representation of the surface of the earth, a television camera for viewing at least a portion of the representation and providing electric video signals corresponding to the scene viewed, a television receiver, responsive to the electric video signals, for providing on a screen an image of the said scene viewed and control means for obscuring the image provided by the receiver when the computed height of the aircraft is substantially equal to or greater than the height of the base of a simulated layer of cloud.

2. Ground-based flight training apparatus as claimed in claim 1, in which the image provided by the receiver is partially obscured when the computed height of the aircraft is substantially equal to the height of the base of a simulated layer of cloud and completely obscured when the computed height of the aircraft is greater than the height of the base of the simulated layer of cloud.

3. Ground-based flight training apparatus as claimed in claim 1 in which the said television receiver is provided with grey signals, alternative to said video signals, to provide a uniform grey, or black, screen image when the computed height of the aircraft is greater than the height of the base of the simulated layer of cloud.

4. Ground-based flight training apparatus as claimed in claim 3, having preset control means for providing an electric signal representative of the height of the base of the simulated layer of cloud, computing means for computing the height of the aircraft in simulated flight and for providing an electric signal corresponding thereto, comparison means for comparing the two said height signals and determining the greater thereof and control or switch means for supplying said video signals to the television receiver when said comparison of the two signals indicates the cloud base height to be the greater and supplying said grey signals to the television receiver when said comparison of the two signals indicates the aircraft height to be the greater.

5. Ground-based flight training apparatus as claimed in claim 3 having means for varying the brightness of said grey signals in a random manner when the computed aircraft height and the simulated cloud base height are substantially equal.

6. Ground-based flight training appaartus as claimed in claim 3, having control means operative to supply the television receiver with both the video signals and the grey signals when the computed aircraft height and the simulated cloud base height are substantially equal, to increase the video signals and reduce the grey signals as the computed aircraft height decreases relatively to the simulated cloud base height and to increase the grey signals and reduce the video signals as the computed aircraft height relatively increases.

7. Ground-based flight training apparatus as claimed in claim 1, having lighting arrangements for illuminating the representation of the surface of the earth to simulate daylight, dusk and night-time appearance thereof and thereby to modify said video signals correspondingly.

8. Ground-based flight training apparatus as claimed in claim 1, having means, independent of said height signal comparison means, for replacing the video signals by the grey signals, for supply to the television receiver, when the scene viewed by the television camera extends beyond a boundary of the representation of the surface of the earth.

9. Ground-based flight training apparatus, including apparatus for simulating visual effects corresponding to the simulated flight of an aircraft, comprising a representation of the surface of the earth, a television camera for viewing at least a portion of the representation and providing electric video signals corresponding to the scene viewed, a television receiver, responsive to electric video signals, for providing on a screen an image of the said scene viewed and control means whereby the image provided by the receiver is at least partially obscured when the computed height of the aircraft is substantially equal to or greater than the height of the base of a simulated layer of cloud, preset control means for providing an electric signal representative of the height of the base of the simulated layer of cloud, computing means for computing the height of the aircraft in simulated flight and for providing an electrical signal corresponding thereto, comparison means for comparing the two said height signals, switch means set to the first and second alternative positions according to which height signal is the greater, control means operative to supply the television receiver with both the video signals and the grey signals when the computed aircraft height and the simulated cloud base height are substantially equal, and independently operative first and second servo motors for respectively varying the video signals and for varying the grey signals.

References Cited

UNITED STATES PATENTS 3,001,300   9/1961   Green _____ 35—12

FOREIGN PATENTS 607,217   8/1948   Great Britain.
640,045   7/1950   Great Britain.
896,405   5/1962   Great Britain.

MALCOLM A. MORRISON, *Primary Examiner.*

J. RUGGIERO, *Assistant Examiner.*

U.S. Cl. X.R.

35—12